(12) United States Patent
Daneluzzo et al.

(10) Patent No.: US 11,382,450 B2
(45) Date of Patent: Jul. 12, 2022

(54) PASTA COOKING APPLIANCE

(71) Applicant: Electrolux Professional S.p.A., Pordenone (IT)

(72) Inventors: Dario Daneluzzo, Sesto al Reghena (IT); Franco Tassan Mangina, Marsure (IT)

(73) Assignee: Electrolux Professional S.p.A., Pordenone (IT)

( * ) Notice: Subject to any disclaimer, the term of this patent is extended or adjusted under 35 U.S.C. 154(b) by 236 days.

(21) Appl. No.: 16/429,690

(22) Filed: Jun. 3, 2019

(65) Prior Publication Data
US 2019/0380525 A1  Dec. 19, 2019

(30) Foreign Application Priority Data

Jun. 18, 2018  (EP) .................................... 18178170

(51) Int. Cl.
*A47J 27/62* (2006.01)
*A23L 5/10* (2016.01)
(Continued)

(52) U.S. Cl.
CPC ............... *A47J 27/62* (2013.01); *A23L 5/13* (2016.08); *A47J 27/004* (2013.01); *A47J 27/18* (2013.01);
(Continued)

(58) Field of Classification Search
CPC .... A47J 27/62; A47J 27/004; A47J 2027/006; A47J 27/18; A23L 5/13; F24C 3/126
(Continued)

(56) References Cited

U.S. PATENT DOCUMENTS

| | | | |
|---|---|---|---|
| 4,332,189 A | | 6/1982 | Stuck |
| 4,869,233 A | * | 9/1989 | Stulen .................. A47J 27/62 |
| | | | 126/374.1 |

(Continued)

FOREIGN PATENT DOCUMENTS

| | | | | |
|---|---|---|---|---|
| CN | 202858803 | | 4/2013 | |
| EP | 0513817 A2 | * | 11/1992 | .............. A47J 27/18 |

(Continued)

OTHER PUBLICATIONS

European Search Report for EP application No. 18178170.9, dated Jan. 2, 2019, 8 pages.

*Primary Examiner* — Steven B McAllister
*Assistant Examiner* — Daniel E. Namay
(74) *Attorney, Agent, or Firm* — Pearne & Gordon LLP

(57) ABSTRACT

Pasta cooking appliance (1) comprising: a self-supporting cabinet (2); an open-top cooking basin (3) which is recessed on the top of the cabinet (2) and is dimensioned to contain several liters of water; heating device (4) which is adapted to selectively heat up the water contained in the cooking basin (3) so as to bring the same water to boil; an overflow drain line (15) which is structured to drain out of the cooking basin (3) the water exceeding a given maximum level (l) inside the cooking basin (3); a sensor device (20) capable of determining when a boil-over phenomenon is taking place in the cooking basin (3); and an electronic control unit (21) which communicates with said sensor device (20) and is adapted to control the heating device (4) for selectively reducing the heat-output of the same heating device (4) when a boil-over phenomenon is taking place in the cooking basin (3).

13 Claims, 2 Drawing Sheets

Figure 1:
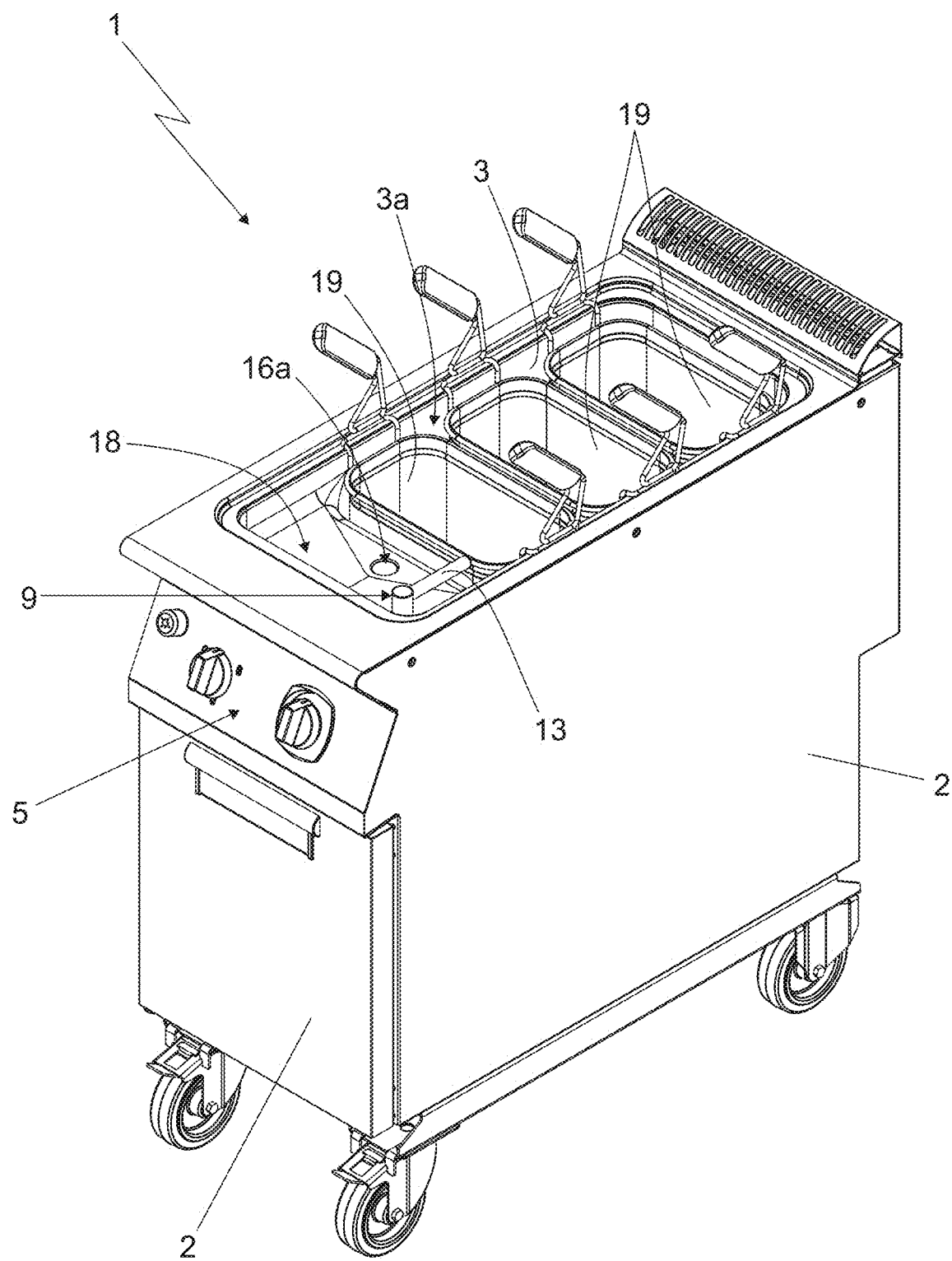

(51) Int. Cl.
    *A47J 27/18*     (2006.01)
    *A47J 27/00*     (2006.01)
    *F24C 3/12*     (2006.01)

(52) U.S. Cl.
    CPC .......... *F24C 3/126* (2013.01); *A47J 2027/006* (2013.01)

(58) Field of Classification Search
    USPC .................................. 126/374, 374.1, 383.1
    IPC .......................... A47J 27/62,27/18; F24C 3/12
    See application file for complete search history.

(56) References Cited

U.S. PATENT DOCUMENTS

| | | | |
|---|---|---|---|
| 5,313,876 A * | 5/1994 | Hilger | A47J 27/18 126/374.1 |
| 5,347,917 A * | 9/1994 | Vezzani | A47J 27/18 99/335 |
| 9,226,609 B2 * | 1/2016 | Romero | A47J 27/18 |
| 2002/0017199 A1 | 2/2002 | Durth | |
| 2010/0326286 A1 * | 12/2010 | Romero | A47J 27/18 99/330 |
| 2012/0042786 A1 * | 2/2012 | Fedell | A47J 27/18 99/356 |
| 2017/0370595 A1 | 12/2017 | Yang et al. | |

FOREIGN PATENT DOCUMENTS

| | | | | |
|---|---|---|---|---|
| EP | 0649623 A2 | * | 4/1995 | ............ A47J 27/18 |
| EP | 1415579 A1 | * | 5/2004 | ............ A47J 27/10 |
| EP | 3583872 A1 | * | 12/2019 | ............ A23L 5/13 |
| JP | 3234635 B2 | * | 12/2001 | ............ A47J 27/18 |
| WO | 2008017113 | | 2/2008 | |

* cited by examiner

PASTA COOKING APPLIANCE

The present invention relates to a pasta cooking appliance.

More specifically, the present invention preferably relates to a professional pasta cooking appliance to which the following description will make explicit reference without however losing in generality.

As is known, professional pasta cooking appliances basically comprise: a substantially parallelepiped-shaped, self-supporting cabinet having, on top, a nearly rectangular, cooking basin or sink which is adapted to contain several liters of water and additionally to selectively accommodate one or more detachable cooking baskets for pasta and similar foodstuff; one or more electric resistors that are generally located immediately outside the cooking basin, usually in abutment on the bottom of the latter, and are adapted to heat up the water contained in the cooking basin, so as to bring water to boil; and an electric power unit that selectively powers the resistors and additionally controls the amperage of the electric current circulating in the resistors, and thus the heat transferred to the water, according to the settings arriving from a manually-operated control panel usually located on front wall of the cabinet.

The main problem of today's pasta cooking appliances is the considerable consumption of electricity for keeping the water inside the cooking basin at boiling temperature. The water contained in the cooking basin, in fact, is continuously subjected to boil over, with all problems that this entails.

More in detail, as is known the starch released into the water during the cooking of pasta and rice significantly decreases the surface tension of water thus the water, when boiling, produces a great amount of foam that accumulates on surface of the water.

When the layer of foam covers the whole surface of the boiling water, the steam is prevented from freely leaving the mass of water. If the kitchen staff fail to quickly reduce the heat transferred to the boiling water, the steam trapped underneath the layer of starch foam accumulates up to produce a sudden rapid expansion of the water volume that causes the boil over of the water.

To prevent the boiling water from dangerously spilling over from the cooking basin, today's professional pasta cooking appliances are provided with an overflow system that immediately drains out of the cooking basin, and straight to an external waste-water drainage pipe, the water exceeding a given maximum level inside the cooking basin.

Obviously, immediately after a turbulent boil-over phenomenon the volume of boiling water inside the cooking basin suddenly reduces and the drained hot water needs to be quickly replaced with fresh water so as to restore the correct level of water inside the cooking basin. Unluckily the fresh water poured into the cooking basin is relatively cold and thus reduces the overall temperature of water mass that, therefore, has to be quickly heated up again up to boiling temperature. Operation that normally takes several minutes.

As a result, the professional pasta cooking appliances has a relatively long recovery time after each boil over and consumes a lot of electric energy.

Aim of the present invention is to solve the drawbacks referred above.

In compliance with the above aims, according to the present invention there is provided a pasta cooking appliance comprising a self-supporting cabinet, an open-top cooking basin recessed on the top of the cabinet and dimensioned to contain several liters of water, a heating device adapted to heat up the water contained in the cooking basin so as to bring the same water to boil, an overflow drain line designed to drain out of the cooking basin the water exceeding a given maximum level inside the cooking basin, at least one sensor capable of detecting when a boil-over phenomenon is taking place in the cooking basin, and an electronic control unit communicating with the at least one sensor and adapted to control the heating device for reducing the heat-output of the heating device when a boil-over phenomenon in the cooking basin is detected.

A boil-over phenomenon is considered to take place in the cooking basin when water flows over the sides of the cooking basin in boiling.

The at least one sensor preferably includes at least one presence sensor capable of detecting when the water flows into or along said overflow drain line.

The overflow drain line preferably includes a downwards-extending tubular element branching off from the cooking basin; in this case, the presence sensor is preferably located inside or outside the tubular element.

The tubular element may have an intermediate bended segment; in such case, the presence sensor is preferably located on said intermediate bended segment.

The presence sensor is, or includes, at least one temperature sensor capable of measuring the temperature of the tubular element.

The electronic control unit is preferably configured to autonomously set to zero or reduce the heat-output of the heating device for a predetermined time interval.

The pasta cooking appliance of the invention may additionally comprise a water supply line connectable to the water mains and adapted to selectively channel/pour water of the water mains directly into the cooking basin, and/or a water drain line branching off from the bottom of the cooking basin and adapted to selectively channel the water contained in the cooking basin outside of the pasta cooking appliance.

Moreover, the pasta cooking appliance preferably comprises also one or more discrete cooking baskets, each dimensioned to internally accommodate a given amount of pasta or similar foodstuff and adapted to be fitted onto the cooking basin so as to plunge all its contents into the water contained inside the cooking basin.

More preferably, the cooking basin is dimensioned to accommodate, at same time, a plurality of removable cooking baskets arranged one adjacent the other.

According to another aspect thereof, the present invention relates to an operating method of a pasta cooking appliance comprising a self-supporting cabinet, an open-top cooking basin recessed on the top of the cabinet and dimensioned to contain several liters of water, the method comprising the steps of:

heating up the water contained in the cooking basin so as to bring the same water to boil;

automatically determining when a boil-over phenomenon is taking place in the cooking basin; and automatically setting to zero or reducing the heating up of the water contained in the cooking basin when a boil-over phenomenon taking place in the cooking basin is determined.

More in detail, the present invention relates to an operating method of a pasta cooking appliance comprising: a self-supporting cabinet; an open-top cooking basin which is recessed on the top of the cabinet and is dimensioned to contain several liters of water; a heating device which is adapted to heat up the water contained in the cooking basin so as to bring the same water to boil; an overflow drain line which is designed to drain out of the cooking basin the water exceeding a given maximum level inside the cooking basin; at least one sensor capable of determining when a boil-over phenomenon is taking place in the cooking basin; and an electronic control unit which communicates with said at least one sensor and is adapted to control the heating device; the operating method comprising the step of detecting via the at least one sensor when a boil-over phenomenon is taking place in the cooking basin, and the step of setting to zero or reducing the heat-output of the heating device when detecting that a boil-over phenomenon is taking place in the cooking basin.

The method preferably comprises the step of draining out of the cooking basin the water exceeding a given maximum level inside the cooking basin, and the step of automatically detecting when a boil-over phenomenon is taking place in the cooking basin comprises detecting when the water is drained out of the cooking basin.

Preferably, automatically setting to zero or reducing the heating up of the water contained in the cooking basin comprises setting to zero or reducing the heating up for a given time interval.

The time interval preferably ranges between 10 and 300 seconds.

The step of automatically setting to zero or reducing the heating up of the water contained in the cooking basin may comprise reducing the heating up to a pre-set intermediate safety value, equal to 50% of a maximum heating up value. Alternatively, the step of automatically setting to zero or reducing the heating up of the water contained in the cooking basin may comprise reducing the heating up of a pre-set amount or percentage, preferably of a percentage ranging between 10% and 50%.

Figure 2:
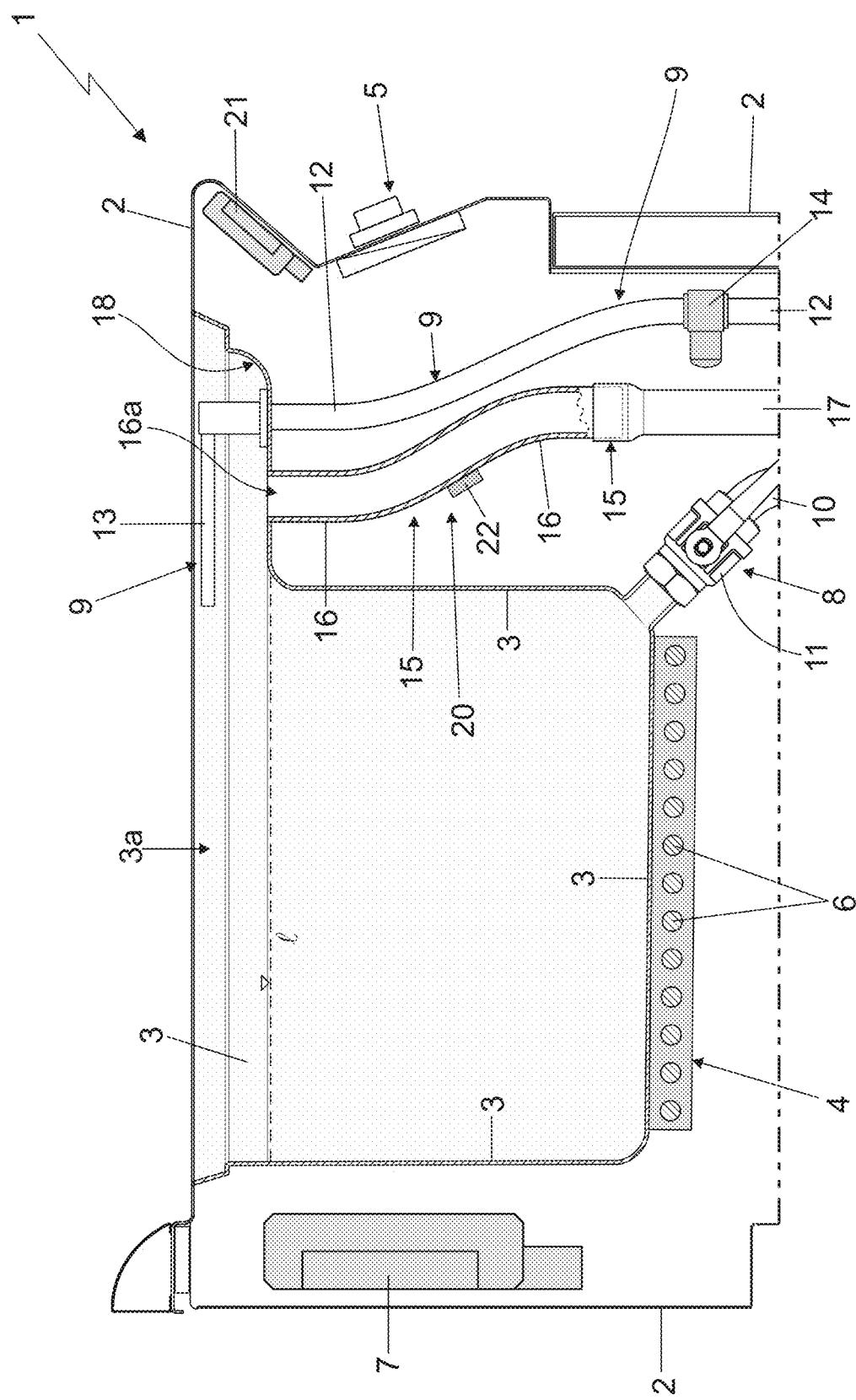

A non-limiting embodiment of the present invention will now be described, by way of example, with reference to the accompanying drawings, in which:

FIG. 1 is a perspective view of a pasta cooking appliance realized in accordance with the teachings of the present invention; whereas FIG. 2 is a side view of the upper portion of the pasta cooking appliance shown in FIG. 1, sectioned along the vertical midplane of the appliance and with parts removed for clarity.

With reference to FIGS. 1 and 2, reference number 1 denotes as a whole a pasta cooking appliance specifically structured for quickly cooking pasta, rise and similar foodstuff and which is suitable for being used in the professional kitchen of restaurants, work canteens or the like.

The pasta cooking appliance 1 firstly comprises: a preferably substantially parallelepiped-shaped, box-like self-supporting cabinet 2 which is preferably made of metal and is preferably provided with a number (four in the example shown) of ground-resting wheels; a preferably nearly rectangular, open-top cooking basin or sink 3 preferably made of metal, which is recessed on the top wall of cabinet 2, preferably in unmovable manner and preferably astride of the vertical midplane of the cabinet 2, and is dimensioned to contain several liters of water; and a heating device 4 which is located inside the cabinet 2 and is adapted to selectively heat up the water contained in the cooking basin 3 so as to bring the same water to boil.

More in detail, the cooking basin or sink 3 is preferably made of stainless steel and preferably has a capacity of more than 10 liters of water.

The heating device 4, in turn, is additionally adapted to control the amount of heat transferred to the water contained in the cooking basin 3 preferably according to the settings arriving from a manually-operated control panel 5 preferably located on a front wall of cabinet 2.

More in detail, the heating device 4 is preferably an electrically-operated heating device and thus preferably comprises: one or more electric resistors 6 that are preferably arranged in abutment against, or incorporated in, the bottom wall and/or any side wall of the cooking basin 3, so as to transmit heat to the body of the cooking basin 3 and to the water contained therein preferably via direct thermal conduction; and preferably also an electric power unit 7 that selectively powers the/each resistor 6 and additionally controls the amperage of the electric current circulating in the/each resistor 6 according to the settings arriving from the control panel 5.

With reference to FIGS. 1 and 2, the pasta cooking appliance 1 preferably additionally comprises: a water drain line 8 which is adapted to selectively channel, out of the pasta cooking appliance 1, the water contained in the cooking basin 3; and a water supply line 9 which is adapted to selectively channel/pour fresh water into the cooking basin 3.

More in detail, the water drain line 8 preferably branches off from the bottom of the cooking basin 3, is connectable to an external waste-water drainage pipe (not shown), and is adapted to selectively channel the water contained in the cooking basin 3 towards the same waste-water drainage pipe.

The water supply line 9, in turn, is preferably connectable to the water mains (not shown) and is adapted to selectively channel/pour the fresh water of the water mains directly into the cooking basin 3.

In the example shown, in particular, the water drain line 8 preferably includes: a first connecting tube 10 preferably made of plastic, that branches off from the bottom of cooking basin 3 and is directly connectable, at the other/opposite end, to the external waste-water drainage pipe (not shown); and a preferably manually-operated, shut-off valve 11 (a ball valve in the example shown) which is interposed between the bottom of cooking basin 3 and the connecting tube 10 for controlling the outflow of the water from the cooking basin 3.

The water supply line 9, in turn, preferably includes: a second connecting tube 12, which is directly connectable to the water mains and preferably ends into a preferably substantially L-shaped, spout 13 or similar tubular element that extends, preferably nearly horizontally, over the upper mouth 3a of the cooking basin 3, so as to pour the fresh water of the water mains directly into the cooking basin 3; and a preferably electrically-operated, second shut-off valve 14 which is preferably arranged along connecting tube 12 or the spout 13, and is able to control the flow of fresh water along connecting tube 12, towards the cooking basin 3. Preferably the shut-off valve 14 is furthermore directly controllable via the control panel 5.

According to a non-shown alternative embodiment, however, the water supply line 9 may lack the L-shaped spout 13, and the second end of connecting tube 12 may be directly connected to a nozzle arranged on a side wall of cooking basin 3.

With reference to FIGS. 1 and 2, the pasta cooking appliance 1 additionally includes an overflow drain line 15 which is structured to immediately and autonomously drain, out of the cooking basin 3 and preferably straight to the aforesaid waste-water drainage pipe (not shown), the water contained in the cooking basin 3 and exceeding a given maximum level l inside the cooking basin 3.

More in detail, the overflow drain line 15 branches off from the cooking basin 3 at a given height from the bottom of the same cooking basin 3 and preferably ends into the aforesaid waste-water drainage pipe (not shown), so as to collect and channel by gravity, out of the cooking basin 3, the water that arrives at said height or maximum level l inside the cooking basin 3.

In the example shown, in particular, the overflow drain line 15 preferably basically comprises: a tubular element 16 preferably made of metal, which branches off from the cooking basin 3 at a given height from the bottom of cooking basin 3 and close to the upper mouth 3a, and extends downwards preferably nearly vertically and preferably adjacent to a side wall of the cooking basin 3; and preferably also a third connecting tube 17, which forms an extension of the descending tubular element 16 and preferably joins the connecting tube 10 of water drain line 8 downstream of the shut-off valve 11. Alternatively, the second end of connecting tube 17 could be directly connectable to the external waste-water drainage pipe.

More in detail, with reference to FIGS. 1 and 2, in the example shown the upper mouth 3a of the cooking basin 3 preferably has an oblong lateral recess 18 that extends substantially horizontally, preferably towards the front wall of cabinet 2 and preferably astride of the vertical midplane of the cooking basin 3.

The overflow drain line 15, in turn, preferably branches off from said lateral recess 18. In other words, the descending tubular element 16 of overflow drain line 15 preferably branches off from the bottom of the lateral recess 18 so as to collect and directly channel, by gravity and towards the external waste-water drainage pipe, the water entering into the lateral recess 18.

The level of water inside the cooking basin 3, therefore, cannot rise above the level of the bottom of the lateral recess 18.

More in detail, in the example shown the descending tubular element 16 is preferably substantially straight and vertical, and the upper mouth 16a of tubular element 16 is preferably welded or anyway joined to the bottom wall of the lateral recess 18, or rather to the nearly horizontal portion of the side wall of the cooking basin 3 forming the recess 18, so as to form a one-piece structure with the cooking basin 3.

Preferably the lateral recess 18 on the upper mouth 3a of cooking basin 3 additionally accommodates also the L-shaped spout 13 of water supply line 9.

With reference to FIG. 1, the pasta cooking appliance 1 preferably also includes at least one, and preferably a plurality of discrete cooking baskets 19. The cooking baskets 19 are preferably substantially rectangular in shape and are dimensioned to internally accommodate a given amount of pasta or similar foodstuff, preferably not exceeding 1 kilo. Moreover the cooking baskets 19 are adapted to be fitted in manually-removable manner into the upper mouth 3a of the cooking basin 3 so as to plunge all their contents into the water contained inside the cooking basin 3. The cooking baskets 19 are also preferably provided with at least one manually-sizable handle allowing easy and safe manual handling of the cooking basket 19.

Preferably, the cooking basin 3 is dimensioned to accommodate, at the same time, a plurality (three in the example shown) of removable cooking baskets 19 arranged one adjacent the other, aligned along the centerline of the upper mouth 3a of the same cooking basin 3.

More in detail, the/each removable cooking basket 19 preferably has a water permeable, concave central section that forms the container for said given amount of pasta or other foodstuff and is dimensioned to deeply fit into the cooking basin 3, and a pair of projecting winglets/appendages that jut out in cantilever manner from opposite sides of the concave central section and are adapted to rest on opposite edges of the upper mouth 3a of cooking basin 3, while the concave central section remains suspended inside the cooking basin 3.

In the example shown, in particular, the concave central section of the/each removable cooking basket 19 is preferably substantially rectangular in shape and preferably has a rigid meshed structure. Preferably the width of the concave central section under approximates (i.e. is slightly lower than) the width of the cooking basin 3.

With reference to FIGS. 1 and 2, the pasta cooking appliance 1 additionally comprises: an electric or electronic sensor device 20 capable of determining (i.e. detecting) when a boil-over phenomenon is taking place in the cooking basin 3; and an electronic control unit 21 which communicates with the sensor device 20 and is adapted to directly control the heating device 4 for selectively autonomously reducing the heat-output of heating device 4 when a boil-over phenomenon is taking place in the cooking basin 3, preferably bypassing the control panel 5, or rather bypassing the settings given by the kitchen staff via the control panel 5.

More in detail, electronic control unit 21 is preferably configured to selectively autonomously set to zero or reduce the heat-output of the heating device 4 for a predetermined time interval $\Delta t$ preferably ranging between 10 and 300 seconds.

Preferably, the sensor device 20 furthermore includes at least one presence sensor 22 which is capable of detecting when some water flows into or along the overflow drain line 15, and is preferably located on the descending tubular element 16 of the overflow drain line 15.

Preferably the electronic control unit 21 is therefore configured to temporarily set to zero or reduce the heat-output of heating device 4 when the presence sensor 22 detects the presence of water in the overflow drain line 15.

In the example shown, in particular, the tubular element 16 preferably has an intermediate bended segment which the water flowing away along the overflow drain line 15 is forced to hit/touch/wet by gravity, and the presence sensor 22 is preferably located on this intermediate bended segment.

Preferably the presence sensor 22 furthermore is or includes at least one temperature sensor which is preferably physically coupled, more preferably directly attached, to the tubular element 16, and which is capable of measuring the current temperature $T_0$ of tubular element 16, or rather of the intermediate bended segment of tubular element 16.

The sensor 22 preferably protrudes inside the tube 16 to directly measure the temperature of water flowing away.

Alternatively, the presence sensor 22 may be a conductometric sensor, an inductive sensor, an capacitive sensor or an infrared sensor; such sensor is advantageously coupled to the tubular element 16 and may be located inside or outside of the tubular element 16.

General operation of the pasta cooking appliance 1 differs from that of known professional pasta cooking appliances at least in that the electronic control unit 21 autonomously temporarily stops or reduces the heat-output of heating device 4 when a boil-over phenomenon is taking place in the cooking basin 3.

In other words, the operating method of pasta cooking appliance 1 comprises: the step of detecting via the sensor device 20 when a boil-over phenomenon is taking place in the cooking basin 3; and the step of substantially immediately setting to zero or reducing, preferably for a given time interval Δt, the heat-output of the heating device 4 when detecting that a boil-over phenomenon is taking place in the cooking basin 3. Preferably the time interval Δt ranges between 10 and 300 seconds.

More in detail, the operating method of pasta cooking appliance 1 preferably comprises the step of monitoring the overflow drain line 15 to detect when the water flows into or along the latter, and then the step of setting to zero or reducing the heat-output of the heating device 4, preferably for a given time interval Δt, when detecting that some water is flowing into or along the overflow drain line 15.

Preferably the step of reducing the heat-output of heating device 4 comprises temporarily reducing the heat-output of the heating device 4 to a pre-set intermediate safety value, for example equal to 50% of the maximum heat-output of heating device 4, or temporarily reducing the heat-output of heating device 4 by a pre-set amount, preferably ranging between 10% and 50% of the currently selected heat-output of heating device 4.

More specifically, when a boil-over phenomenon is taking place within the pasta cooking appliance 1, the boiling water that spills over from cooking basin 3 and enters into the overflow drain line 15 inevitably causes a sudden increases of the temperature of tubular element 16. As a consequence any sudden soaring of the temperature of tubular element 16 indicates that a boil-over phenomenon is taking place in the cooking basin 3.

Assuming now that the presence sensor 22 is a temperature sensor located on tubular element 16 for detecting the temperature of the latter, the electronic control unit 21 is preferably configured to temporarily reduce the heat-output of heating device 4 when there is a sudden soaring of the current temperature $T_0$ of tubular element 16.

More in detail, assuming that the kitchen staff has set the heating device 4 to the maximum heating power (i.e. the maximum heat-output), the electronic control unit 21 preferably continuously monitors the temperature $T_0$ of the tubular element 16 and operates as follows.

When the temperature $T_0$ of the tubular element 16 has a sudden rise beyond a given higher threshold value preferably above 70° C., the electronic control unit 21 assumes that the water inside the cooking basin 3 is boiling over and immediately autonomously stops or reduces the heat-output of the heating device 4 to a pre-set intermediate safety value preferably equal to 50% of the maximum heat-output of heating device 4.

In the example shown, in particular, the electronic control unit 21 preferably assumes that the water inside cooking basin 3 is boiling over when the temperature $T_0$ of tubular element 16 rises above 80° C.

Preferably, the electronic control unit 21 furthermore keeps the heat-output of heating device 4 at the aforesaid intermediate safety value for a given time interval Δt preferably ranging between 10 seconds and 300 seconds, or alternatively until the current temperature $T_0$ of tubular element 16 drops beneath a lower threshold value preferably ranging between 50° C. and 70° C. (for example 65° C.).

When the time interval Δt lapses or the temperature $T_0$ of tubular element 16 drops beneath the lower threshold, the electronic control unit 21 immediately brings the heat-output of heating device 4 back to the maximum value or to the value previously mutually set by the kitchens staff via the control panel 5.

In the example shown, in particular, the electronic control unit 21 preferably keeps the heat-output of heating device 4 at the aforesaid intermediate safety value for 50 seconds, and then returns the heat-output of heating device 4 to the maximum value. In other words, the time interval Δt is preferably equal to about 50 seconds.

Obviously, if the water in the cooking basin 3 is still boiling over when the heat-output of heating device 4 is restored to the original value, the electronic control unit 21 is configured to again immediately temporarily reduces the heat-output of heating device 4 preferably for the same time interval Δt.

In other words, the electronic control unit 21 is configured to repeatedly temporarily reduce the heat-output of heating device 4 until the water contained in cooking basin 3 stops boiling over.

The advantages resulting from the use of a sensor device 20 and electronic control unit 21 are remarkable.

Experimental tests revealed that the selective and immediate temporarily reduction of the heat output of heating device 4, allows to minimize the waste of hot water during operation of the pasta cooking appliance 1, thus significantly shortening the recovery time after a boil-over phenomenon and at same time highly increasing the energy efficiency of pasta cooking appliance 1 vis-à-vis the pasta cooking appliances currently on the market.

Clearly, changes and variations may be made to the pasta cooking appliance 1 and to its operating method without, however, departing from the scope of the present invention.

For example, according to a non-shown alternative embodiment, the upper mouth 3a of cooking basin 3 preferably lacks the lateral recess 18 and the overflow drain line 15 directly branches from a side wall of cooking basin 3, immediately beneath the upper mouth 3a of cooking basin 3.

The invention claimed is:
1. Pasta cooking appliance comprising:
a self-supporting cabinet;
an open-top cooking basin recessed on the top of the cabinet and dimensioned to contain water;
a heating element adapted to selectively heat up the water contained in the cooking basin so as to bring the water therein to boil;
an overflow drain line structured to drain out of the cooking basin a portion of the water exceeding a given maximum level inside the cooking basin;
at least one sensor adapted to determine when a boil-over phenomenon is taking place in the cooking basin; and
an electronic control unit which communicates with said at least one sensor and is adapted to control the heating element for reducing heat-output of the heating element when a boil-over phenomenon in the cooking basin is determined,
wherein the at least one sensor includes a presence sensor attached to the overflow drain line and adapted to directly detect water flowing into or along said overflow drain line.

2. The pasta cooking appliance according to claim 1, wherein the overflow drain line includes a downwards-extending tubular element branching off from the cooking basin and the presence sensor is located inside or outside said tubular element.

3. The pasta cooking appliance according to claim 2, wherein said tubular element has an intermediate bended segment and the presence sensor is located on said intermediate bended segment.

4. The pasta cooking appliance according to claim 2, wherein the presence sensor is, or includes, at least one temperature sensor adapted to measure a temperature of said tubular element.

5. The pasta cooking appliance according to claim 1, wherein the electronic control unit is configured to autonomously set to zero, or reduce, the heat-output of the heating element for a predetermined time interval.

6. The pasta cooking appliance according to claim 1, additionally comprising:
   a water supply line which is connectable to a water mains and is adapted to selectively channel/pour water of the water mains directly into the cooking basin; and/or
   a water drain line that branches off from a bottom of the cooking basin and is adapted to selectively channel the water contained in the cooking basin outside of the same pasta cooking appliance.

7. The pasta cooking appliance according to claim 1, additionally comprising one or more discrete cooking baskets each of which is dimensioned to internally accommodate a given amount of pasta or similar foodstuff and is adapted to be fitted onto the cooking basin so as to plunge all its contents into the water contained inside the cooking basin.

8. The pasta cooking appliance according to claim 7, wherein the cooking basin is dimensioned to removably accommodate, at the same time, a number of said one or more discrete cooking baskets arranged one adjacent the other.

9. Operating method of a pasta cooking appliance comprising a self-supporting cabinet and an open-top cooking basin which is recessed on a top of the cabinet and is dimensioned to contain water, the method comprising the steps of:
   heating up water contained in the cooking basin so as to bring the water to boil;
   draining out of the cooking basin the water exceeding a given maximum level inside the cooking basin;
   automatically detecting a water boil-over phenomenon in the cooking basin; and
   automatically setting to zero or reducing heating of the water contained in the cooking basin when a boil-over phenomenon in the cooking basin is detected;
   wherein the step of automatically detecting when a boil-over phenomenon is taking place in the cooking basin comprises directly detecting water flowing into or along an overflow drain line after having been drained out of the cooking basin using a sensor attached to the overflow drain line.

10. The operating method according to claim 9, wherein automatically setting to zero or reducing the heating of the water contained in the cooking basin comprises setting to zero or reducing the heating for a given time interval.

11. The operating method according to claim 10, wherein the time interval ranges between 10 and 300 seconds.

12. The operating method according to claim 9, wherein the step of automatically setting to zero or reducing the heating of the water contained in the cooking basin comprises reducing the heating to a pre-set intermediate safety value, or reducing the heating by a pre-set percentage.

13. The operating method according to claim 12, wherein said pre-set percentage ranges between 10% and 50%.

* * * * *